US010065579B2

(12) United States Patent
Patrick et al.

(10) Patent No.: US 10,065,579 B2
(45) Date of Patent: Sep. 4, 2018

(54) SCUFF PLATE FOR CARGO RETENTION

(71) Applicant: Ford Global Technologies, LLC, Dearborn, MI (US)

(72) Inventors: David T. Patrick, Canton, MI (US); Steve Mayes, Wayne, MI (US); Mark McCarthy, Ann Arbor, MI (US); Philip D. LaPenna, Waterford, MI (US); Logan Kluge, Muncie, MI (US); Paul Alan Hellebuyck, South Lyon, MI (US); Thomas Matthew Lewis, Royal Oak, MI (US); Alfred Jacob Glauser, Canton, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 4 days.

(21) Appl. No.: 15/463,317

(22) Filed: Mar. 20, 2017

(65) Prior Publication Data
US 2018/0215327 A1     Aug. 2, 2018

Related U.S. Application Data

(60) Provisional application No. 62/453,838, filed on Feb. 2, 2017.

(51) Int. Cl.
| | |
|---|---|
| *B60R 13/01* | (2006.01) |
| *B60R 13/02* | (2006.01) |
| *B60N 2/30* | (2006.01) |
| *B60N 2/36* | (2006.01) |
| *B60R 5/04* | (2006.01) |
| *B60J 5/10* | (2006.01) |

(52) U.S. Cl.
CPC ........ *B60R 13/0243* (2013.01); *B60N 2/3075* (2013.01); *B60N 2/36* (2013.01); *B60R 13/011* (2013.01); *B60J 5/101* (2013.01); *B60R 5/047* (2013.01)

(58) Field of Classification Search
CPC ..... B60R 13/01; B60R 13/011; B60R 13/013; B60R 2013/015; B60R 2013/016; B60R 2013/018; B62D 25/087; B62D 25/2027
USPC ...... 296/37.16, 39.1, 1.08, 203.04; D12/195, D12/203, 221
See application file for complete search history.

(56) References Cited

U.S. PATENT DOCUMENTS

| | | | |
|---|---|---|---|
| 5,322,335 A * | 6/1994 | Niemi | B60N 2/6009 296/39.1 |
| 5,743,589 A | 4/1998 | Felker | |
| 6,062,633 A * | 5/2000 | Serizawa | B60R 16/0215 296/199 |
| 6,663,156 B1 * | 12/2003 | Kincaid | B60R 5/04 296/37.14 |
| 7,241,092 B2 | 7/2007 | Lim | |
| 7,794,005 B2 * | 9/2010 | Storgato | B60N 2/3013 296/37.16 |
| 7,866,926 B2 | 1/2011 | Lim | |

(Continued)

*Primary Examiner* — Gregory A Blankenship
(74) *Attorney, Agent, or Firm* — Vichit Chea; Price Heneveld LLP

(57) ABSTRACT

A scuff plate for a vehicle includes a sloped front side in physical contact with a cargo-area floor panel. The cargo-area floor panel can have a slope angle greater than zero in a downward direction and the sloped front side can have a ramp angle at least equal to the slope angle in an upward direction.

20 Claims, 10 Drawing Sheets

(56) References Cited

U.S. PATENT DOCUMENTS

| | | | | |
|---|---|---|---|---|
| 8,356,853 B2* | 1/2013 | Huber | ............... | B60N 2/3013 |
| | | | | 296/37.14 |
| 8,888,157 B2* | 11/2014 | Narahara | ............ | B62D 25/2027 |
| | | | | 296/1.08 |
| 9,862,309 B2* | 1/2018 | Oliverio | ............... | F21S 43/15 |
| 2007/0018475 A1* | 1/2007 | McGinnis | ............ | B60R 13/01 |
| | | | | 296/39.1 |
| 2010/0019511 A1* | 1/2010 | Dilley | ............... | B60R 13/013 |
| | | | | 292/194 |
| 2010/0026031 A1* | 2/2010 | Jouraku | ............ | B60R 5/04 |
| | | | | 296/37.16 |
| 2011/0095571 A1* | 4/2011 | Maguire | ............... | B60N 2/36 |
| | | | | 296/193.07 |
| 2011/0241372 A1* | 10/2011 | Kusu | ............ | B60R 5/048 |
| | | | | 296/24.43 |
| 2013/0328354 A1* | 12/2013 | Bauer | ............... | B60R 16/0215 |
| | | | | 296/199 |
| 2014/0145465 A1* | 5/2014 | Preisler | ............... | B32B 3/12 |
| | | | | 296/37.5 |
| 2015/0046027 A1* | 2/2015 | Sura | ............... | B60K 35/00 |
| | | | | 701/36 |
| 2015/0061319 A1* | 3/2015 | Johnson | ............ | B62D 33/023 |
| | | | | 296/183.1 |
| 2016/0046335 A1* | 2/2016 | Saido | ............... | B62D 43/10 |
| | | | | 296/37.2 |
| 2016/0280151 A1* | 9/2016 | Engerman | ............... | B60R 11/06 |
| 2017/0246996 A1* | 8/2017 | Vu | ............... | B60R 13/06 |

\* cited by examiner

SCUFF PLATE FOR CARGO RETENTION

CROSS-REFERENCE TO RELATED APPLICATION

This application claims priority to and the benefit under 35 U.S.C. § 119(e) of U.S. Provisional Patent Application No. 62/453,838, filed on Feb. 2, 2017, entitled "SCUFF PLATE FOR CARGO RETENTION," the entire disclosure of which is hereby incorporated herein by reference.

FIELD OF THE DISCLOSURE

The present disclosure generally relates to a vehicle cargo area. More specifically, the present disclosure relates to cargo retention in the vehicle cargo area.

BACKGROUND OF THE INVENTION

Vehicles, such as sport utility vehicles, crossover vehicles, hatchbacks, and the like, are typically equipped with a liftgate or access door. The rearwardmost portion of these vehicles is typically used for storage of cargo items. Cargo items can include generally spherical or cylindrical items (e.g. golf balls, basketballs, paper towel, grocery jars, drink containers, etc.). During normal vehicle operation, the cargo items can move into contact with the liftgate or access door. Once the liftgate or access door is opened it is possible for the cargo items to roll and accelerate out of the opened liftgate or access door and fall onto the ground.

SUMMARY OF THE INVENTION

According to a first aspect of the present disclosure, a vehicle includes rear seats that are movable between a use position and a stowed position. A closeout panel extends over the rear seats when the rear seats are placed in the stowed position. A cargo-area floor panel is positioned rearward of the rear seats. A liftgate is positioned on the vehicle. A ramped scuff plate is positioned between the cargo-area floor panel and the liftgate. The ramped scuff plate includes a sloped front side that is in physical contact with the cargo-area floor panel, a top side that defines an upper extreme of the ramped scuff plate, and a rear side that defines a rearwardmost portion of the ramped scuff plate.

Embodiments of the first aspect of the present disclosure can include any one or a combination of the following features:
the closeout panel is a seatback of the rear seat;
the closeout panel has a closeout panel angle in the range of about 0-10 degrees;
the closeout panel has a closeout panel angle of about 3 degrees;
the cargo-area floor panel has a slope angle of about 0-10 degrees;
the sloped front side has a ramp angle of at least about 15 degrees;
the rear side has a height of at least about 18 mm; and
the top side has a width of less than 20 mm.

According to a second aspect of the present disclosure, a vehicle includes a cargo-area floor panel, an access door, and a ramped scuff plate. The ramped scuff plate is positioned between the cargo-area floor panel and the access door. The ramped scuff plate includes a sloped front side that is in physical contact with the cargo-area floor panel and a rear side that defines a rearwardmost portion of the ramped scuff plate.

Embodiments of the second aspect of the present disclosure can include any one or a combination of the following features:
the ramped scuff plate further includes a top side that defines an upper extreme of the ramped scuff plate;
the cargo-area floor panel has a slope angle of about 0-10 degrees;
the sloped front side has a ramp angle of at least about 10 degrees;
the top side has a height of at least about 15 mm; and
the top side has a width of less than 20 mm.

According to a third aspect of the present disclosure, a scuff plate for a vehicle includes a sloped front side that is in physical contact with a cargo-area floor panel. The cargo-area floor panel has a slope angle that is greater than zero in a downward direction. The sloped front side has a ramp angle that is at least equal to the slope angle in an upward direction.

Embodiments of the third aspect of the present disclosure can include any one or a combination of the following features:
the scuff plate further includes a top side that defines an upper extreme;
the top side operably couples with the sloped front side to form a top side slope angle, wherein the top side slope angle is in the range of about 0-180 degrees
the scuff plate further includes a rear side that defines a rearwardmost portion;
the rear side operably couples with the sloped front side to form a rear side slope angle, wherein the rear side slope angle is in the range of about 0-180 degrees;
the rear side operably couples with the top side to form a rear side slope angle, wherein the rear side slope angle is in the range of about 0-180 degrees;
the ramp angle is at least about 10 degrees;
the ramp angle is at least about 15 degrees,
the slope angle is about 0-10 degrees;
the top side has a width of less than 20 mm;
the top side has a height of at least about 15 mm;
the rear side has a height of at least about 18 mm; and
the scuff plate is positioned in the vehicle proximal an access door.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
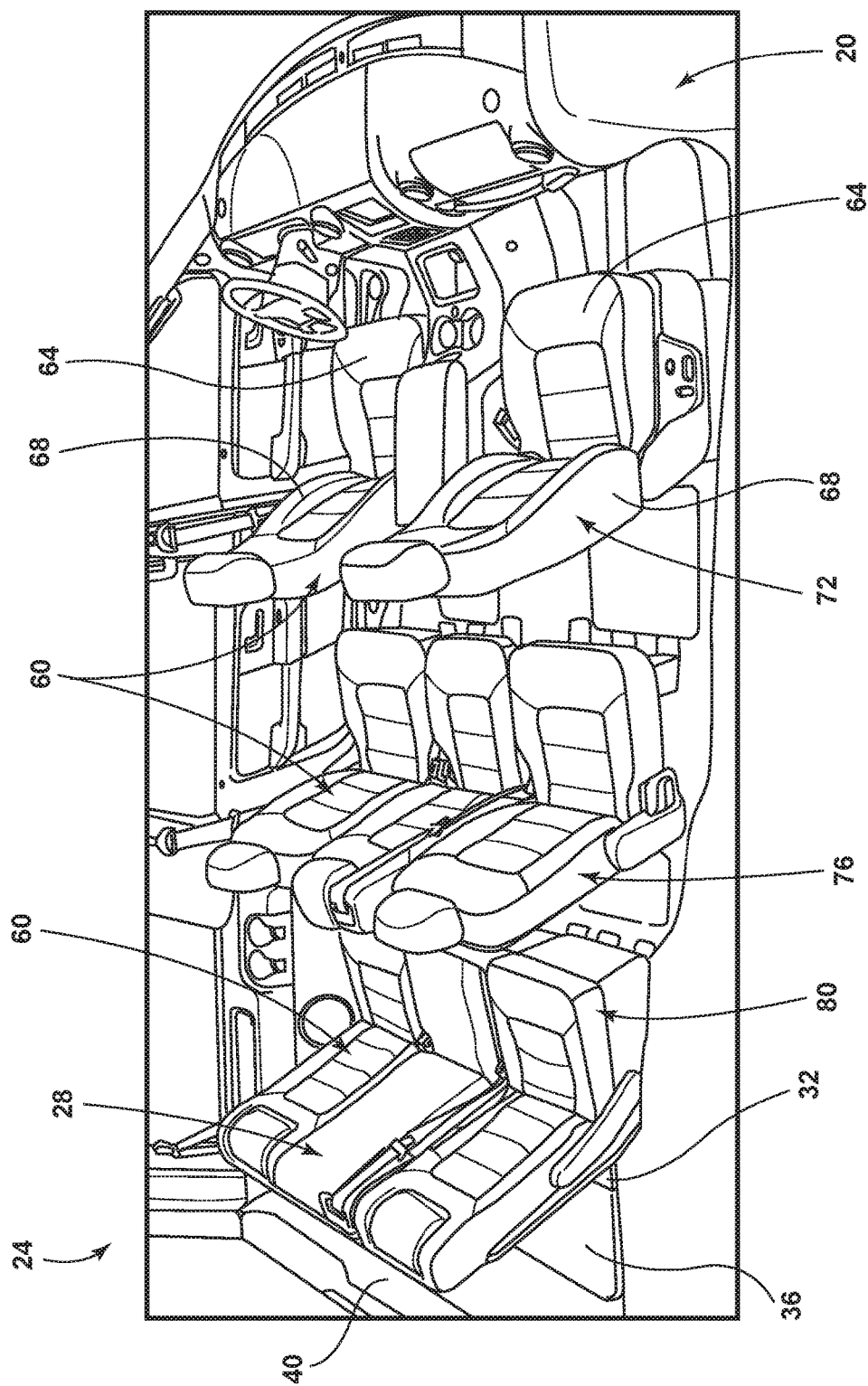
FIG. 1 is a side perspective view of a cabin of a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a scuff plate. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, a cabin 20 of a vehicle 24 is illustrated having rear seats 28 that are movable between a use position and a stowed position. A closeout panel 32 extends over the rear seats 28 when the rear seats 28 are placed in the stowed position. A cargo-area floor panel 36 is positioned rearward of the rear seats 28. An access door in the form of a liftgate 40 is positioned rearward of the cargo-area floor panel 36. A scuff plate 44 is positioned between the cargo-area floor panel 36 and the liftgate 40. The scuff plate 44 includes a sloped front side 48 that is in physical contact with the cargo-area floor panel 36, a top side 52 that defines an upper extreme of the scuff plate 44, and a rear side 56 that defines a rearwardmost portion of the scuff plate 44.

Referring specifically to FIG. 1, the vehicle 24 generally has one or more seating assemblies 60. The seating assemblies 60 can include a seat 64 and a seatback 68. Additionally, the vehicle 24 often has more than one row of seating. For example, the vehicle 24 can include a forward most first row of seating 72, a middle second row of seating 76, and/or a rearwardmost third row of seating 80. The rearward seating assemblies 60 (i.e. the second row of seating 76 and/or the third row of seating 80) often are movable between a use position and a stowed position. More specifically, the second row of seating 76 and/or the third row of seating 80 can be placed in the stowed position to increase a cargo storage capacity of the vehicle 24 in the embodiment shown.

Figure 2:
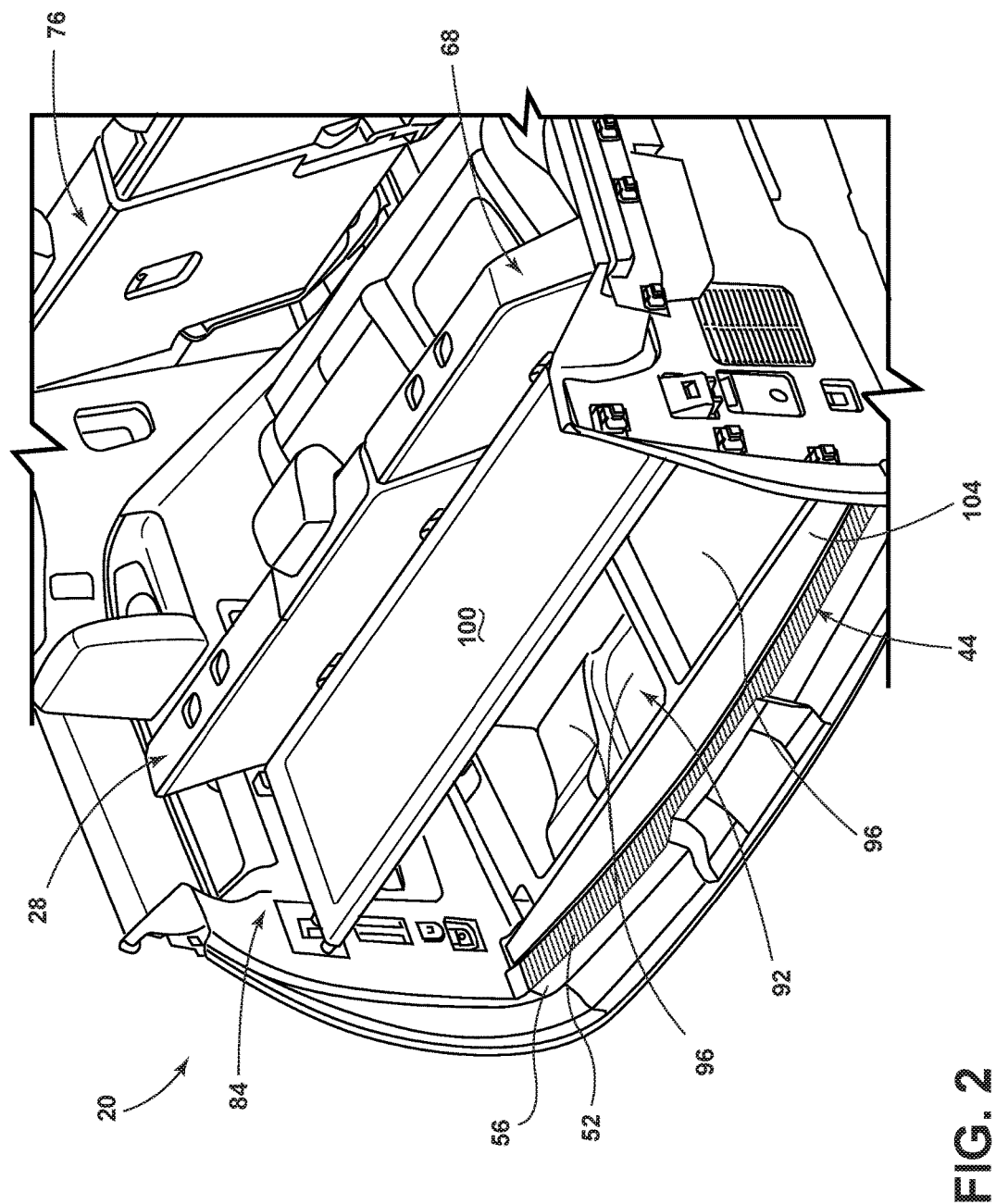
FIG. 2 is an upper rear perspective view of a rear cargo area of the cabin of the vehicle illustrating a retractable privacy cover in a horizontal position rearward of rear seats.
Figure 3:
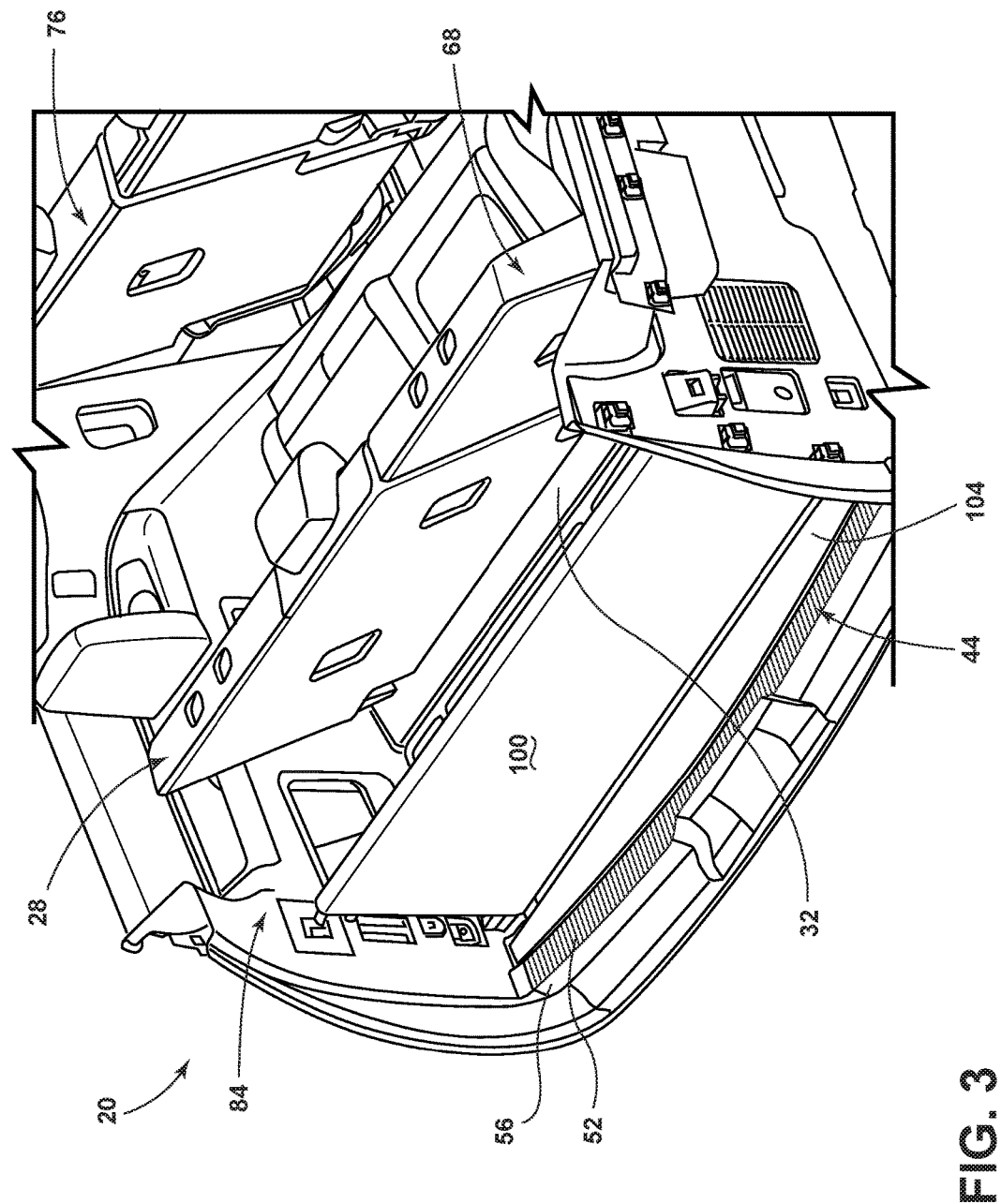
FIG. 3 is an upper rear perspective view of the cargo area of the cabin of the vehicle illustrating the retractable privacy cover in a vertical position rearward of rear seats.
Figure 4:
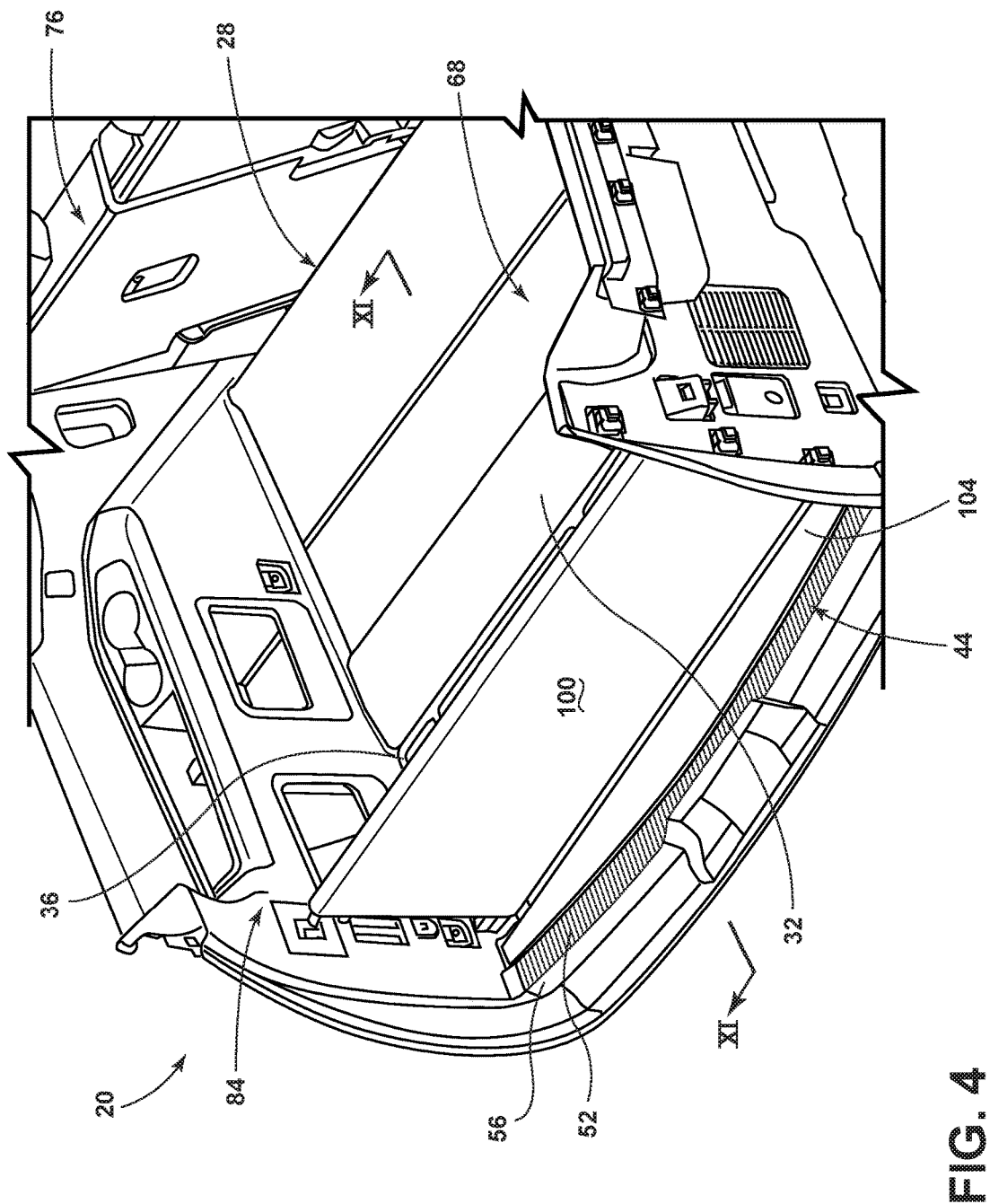
FIG. 4 is an upper rear perspective view of the cargo area of the cabin of the vehicle illustrating the retractable privacy cover in the vertical position with the rear seats in a stowed position.

Referring now to FIGS. 2-4, a cargo area 84 of the vehicle 24 (FIG. 1) is often positioned rearward of the rear seats 28. The rear seats 28 can be the third row of seating 80. However, if the third row of seating 80 is placed in the stowed position (FIG. 4), thereby increasing the cargo area 84 of the vehicle 24, then the second row of seating 76 becomes the rear seats 28. The closeout panel 32 can extend over a gap 88 (FIG. 7) that often exists behind the rear seats 28 when the rear seats 28 is placed in the stowed position. The closeout panel 32 can be operably coupled to a rearward side of the seatback 68 such that the gap 88 is continually covered whether the rear seats 28 is in the use position (FIG. 2) or the stowed position (FIG. 4). Alternatively, the rearward side of the seatback 68 can be utilized as the closeout panel 32. That is, the rear seats 28 can be positioned to abut or be adjacent to the cargo-area floor panel 36 when the rear seats 28 is in the use position and the stowed positioned to prevent items from entering the gap 88.

Referring again to FIGS. 2-4 the cargo area 84 can include at least one cargo management system 92. The cargo management system 92 can include one or more storage wells 96. The cargo area 84 can further include a retractable privacy cover 100. The retractable privacy cover 100 can be placed in a horizontal position (FIG. 2), a vertical position (FIG. 3), or a stowed position such that the retractable privacy cover 100 is fully retracted into a portion of the retractable privacy cover 100. The cargo management system 92 can include lids 102 (FIG. 5) that fit over the storage wells 96 and other components of the cargo management system 92 such that the cargo area 84 presents a generally smooth or continuous surface for cargo while permitting access to the storage wells 96 at the consumers desire. The cargo management system 92 can terminate at a rearwardmost portion with a transition panel 104. The transition panel 104 may be in physical contact with the scuff plate 44. The scuff plate 44 is positioned between the liftgate 40 and the transition panel 104. The scuff plate 44 can actively engage with the transition panel 104 in a manner that operably couples the scuff plate 44 to the transition panel 104 in a directly abutting fashion. The retractable privacy cover 100 can act as an additional form of cargo retention, particularly for large items (e.g. items with a radius greater than 110 mm), when the retractable privacy cover 100 is placed in the vertical position.

Figure 5:
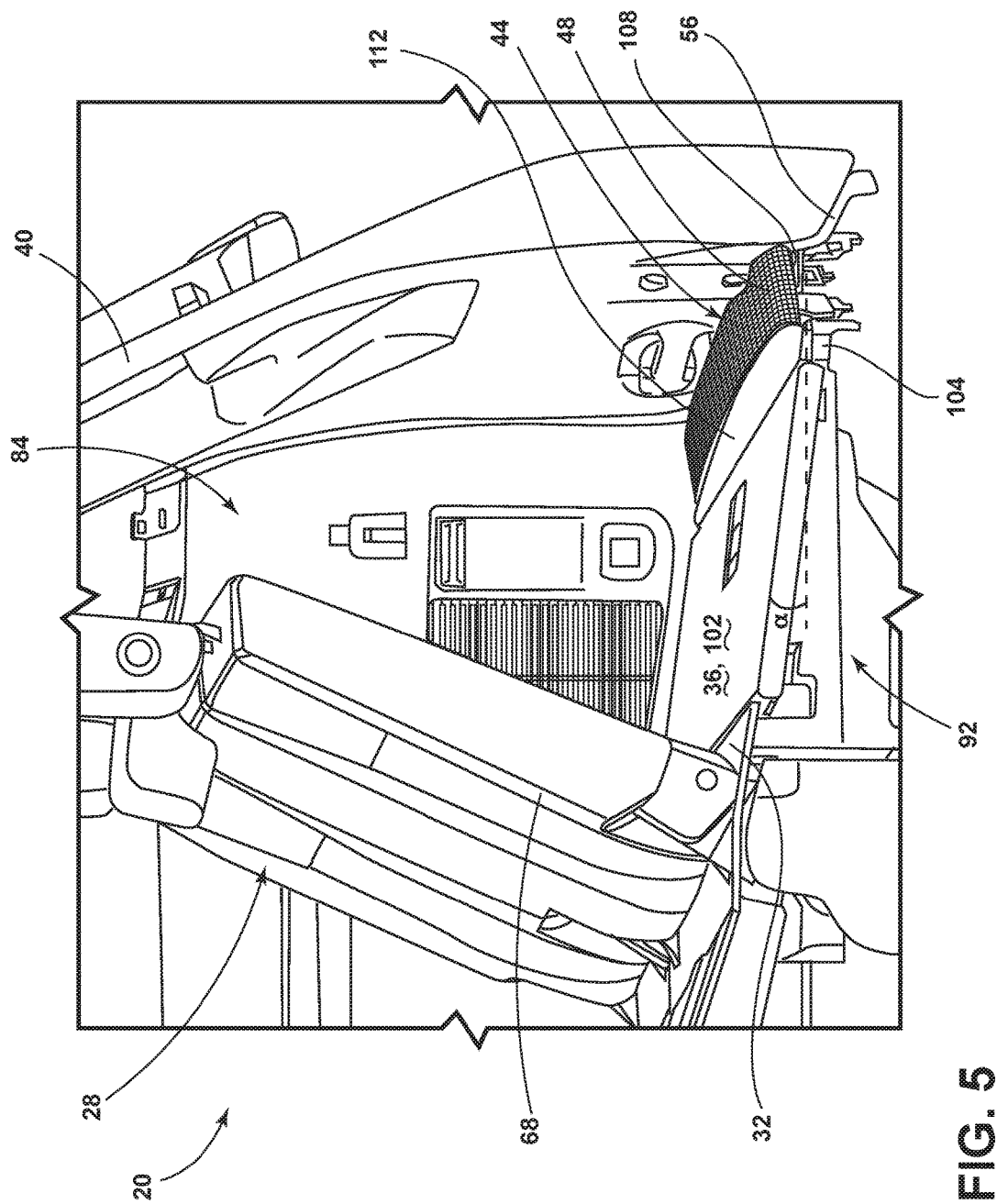
FIG. 5 is a side perspective view of the rear seats and the cargo area.
Figure 6:
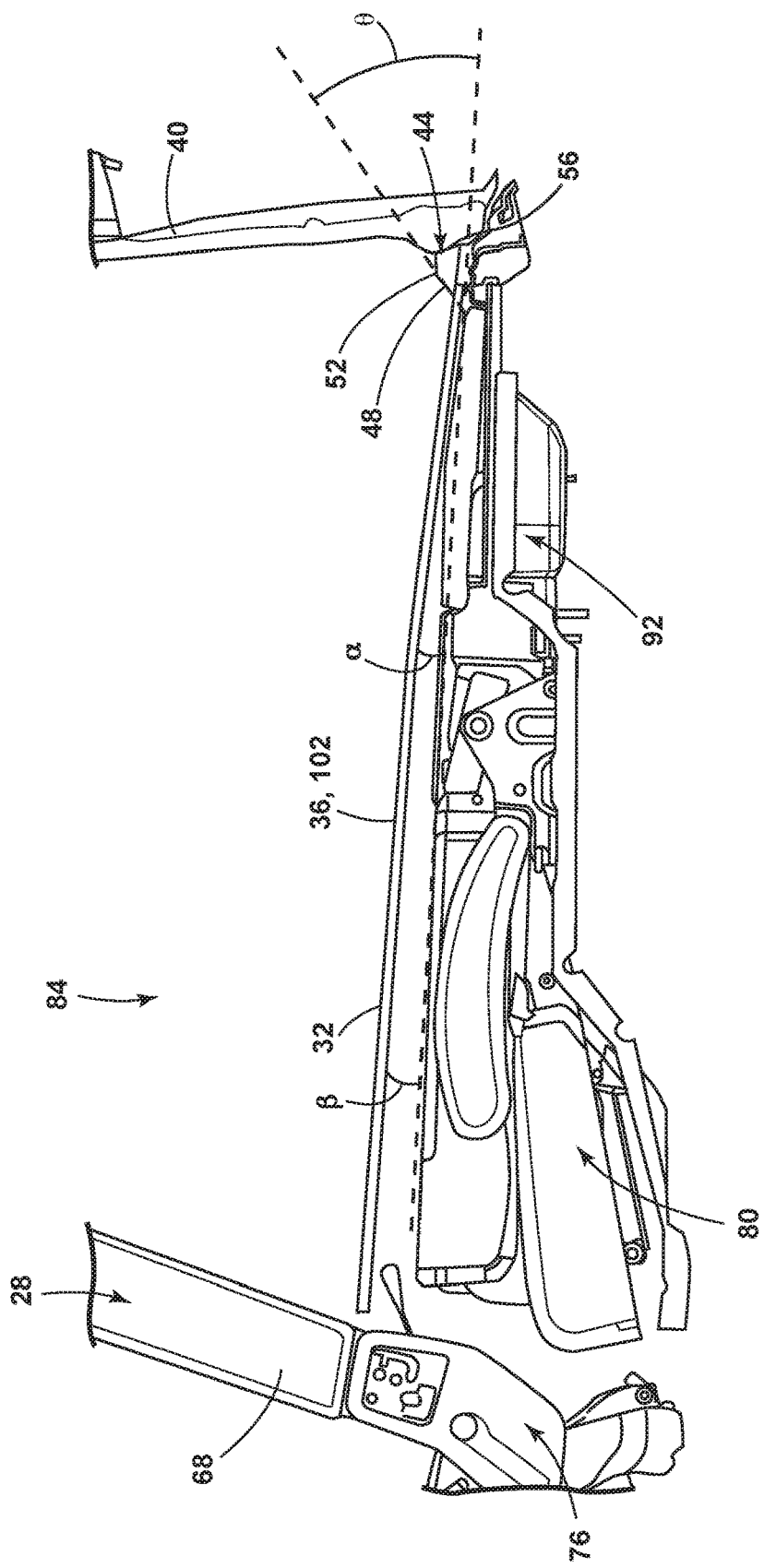
FIG. 6 is a side cross-sectional view, taken at line VI-VI of FIG. 4, further illustrating the rear seats and the cargo area.

Referring to FIGS. 5 and 6, the lid 102 of the cargo management system 92 can also serve as the cargo-area floor panel 36. The cargo-area floor panel 36 can have a slope angle α relative to a horizontal plane. The slope angle α can be about 0-10 degrees, about 1-10 degrees, about 2-10 degrees, about 3-10 degrees, about 4-10 degrees, about 5-10 degrees, about 6-10 degrees, about 7-10 degrees, about 8-10 degrees, about 9-10 degrees, about 1-9 degrees, about 2-8 degrees, about 3-7 degrees, or about 4-6 degrees. More specifically, the slope angle α of the cargo-area floor panel 36 can be about 3 degrees, about 4 degrees, about 5 degrees, about 6 degrees, about 7 degrees, about 8 degrees, or about 9 degrees. The cargo-area floor panel 36 extends from the front side to the rearward side and abuts or is adjacent to the transition panel 104. The transition panel 104 physically engages with the scuff plate 44. More specifically, an underside 108 of the scuff plate 104 engages with an upper side 112 of the transition panel 104. Alternatively, the sloped front side 48 of the scuff plate 44 can engage with the transition panel 104 in a manner that provides the sloped front side 48 at least partially recessed or below the transition panel 104. When the rear seats 28 is folded down to the stowed position (FIG. 6), the closeout panel 32 and/or a rearward side of the seatback 68 present a generally continuous surface with the cargo-area floor panel 36 and thereby increase the storage capacity of the cargo area 84.

Referring again to FIGS. 5 and 6, the closeout panel 32 and/or the rearward portion of the seatback 68 can have a closeout panel angle β relative to a horizontal plane. The closeout panel angle β can be about 0-10 degrees, about 1-10 degrees, about 2-10 degrees, about 3-10 degrees, about 4-10 degrees, about 5-10 degrees, about 6-10 degrees, about 7-10 degrees, about 8-10 degrees, about 9-10 degrees, about 1-9 degrees, about 2-8 degrees, about 3-7 degrees, or about 4-6 degrees. More specifically, the closeout panel angle β can be about 1 degree, about 2 degrees, about 3 degrees, about 4 degrees, about 5 degrees, about 6 degrees, about 7 degrees, about 8 degrees, or about 9 degrees. The slope angle α and the closeout panel angle β are non-zero in order to provide ample storage space for the rear seats 28 and for cargo stored in the cargo management system 92. Accordingly, the cargo-area floor panel 36 slopes downward towards the liftgate 40, which results in round and cylindrical cargo items tending to roll and accelerate towards the liftgate 40, especially when the vehicle 24 is in motion or parked on an incline. Therefore, the scuff plate 44 includes the sloped front side 48 that has a ramp angle θ that slopes upward towards the liftgate 40. The ramp angle θ can be in the range of about 1-20 degrees, about 5-20 degrees, about 10-20 degrees, about 15-20 degrees, at least about 3 degrees, at least about 6 degrees, at least about 9 degrees, at least about 12 degrees, at least about 15 degrees, according to various embodiments. The scuff plate 44 further includes the top side 52 and the rear side 56. The top side 52 is provided with a width W (FIG. 8) of less than about 40 mm, less than about 35 mm, less than about 30 mm, less than about 25 mm, less than about 20 mm, less than about 15 mm, less than about 10 mm, less than about 5 mm, according to various embodiments. More specifically, the width W of the top side 52 can be about 0-5 mm, about 5-10 mm, about 10-15 mm, about 15-20 mm, about 20-25 mm, or about 25-30 mm. The rear side 56 has a height H (FIG. 8) of at least about 9 mm, at least about 12 mm, at least about 15 mm, at least about 18 mm, at least about 21 mm, at least about 24 mm, at least about 27 mm, at least about 30 mm, at least about 33 mm, or at least about 36 mm. The liftgate 40 can abut the top side 52 and/or the rear side 56.

Figure 7:
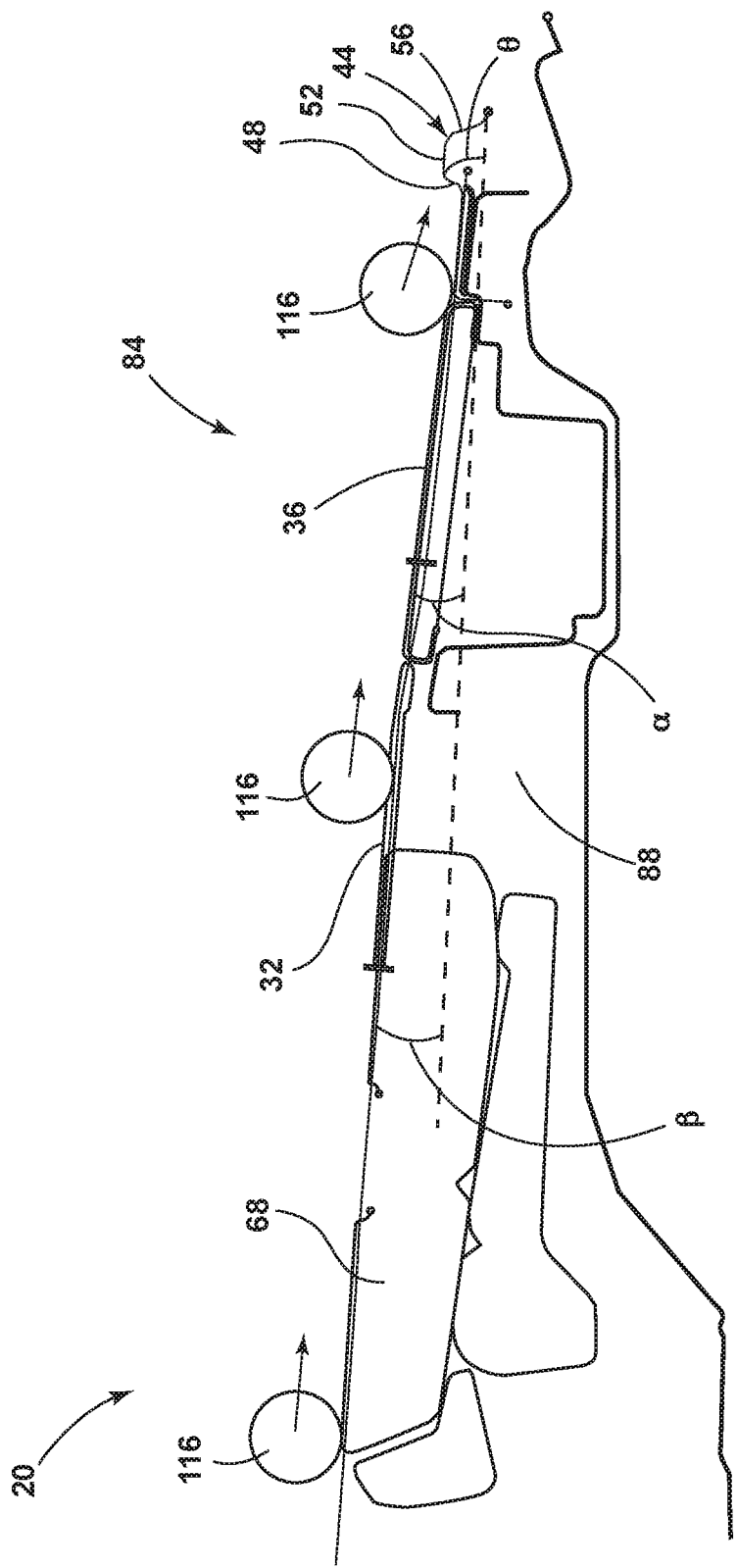
FIG. 7 is a side cross-sectional view, taken at line VI-VI of FIG. 4, further illustrating cargo items in the cargo area.
Figure 10:
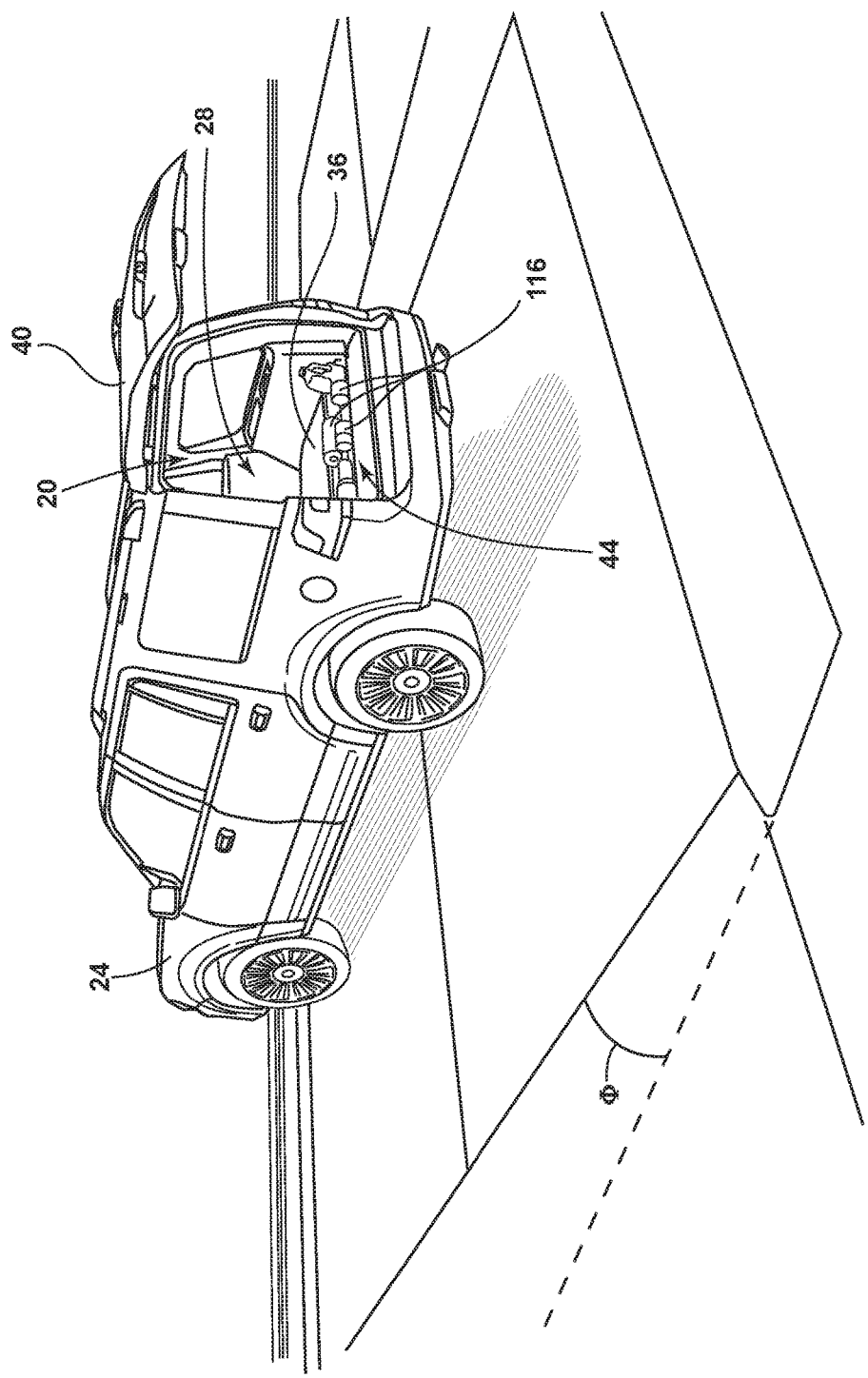
FIG. 10 is a rear perspective view of the vehicle having cargo items in the cargo with the liftgate open and parked on an inclined surface.

Referring now to FIG. 7, cargo items 116 that are generally round or cylindrical in shape will tend to roll rearward in the cargo area 84 toward the liftgate 40 due to gravity and/or the motion of the vehicle 24 (FIG. 10). As the cargo items 116 traverse the rearward portion of the seatback 68 that is in the stowed position, the cargo items 116 are experiencing the closeout panel angle β. As the cargo items 116 continue to traverse rearward on the cargo-area floor panel 36 they experience the slope angle α of the cargo-area floor panel 36. In one embodiment, the slop angle α and the closeout panel angle β can be equivalent to one another. As the cargo items 116 approach the scuff plate 44, the cargo items 116 may have accrued momentum that, if the liftgate 40 is in the open position, can result in the cargo items 116 having sufficient momentum to exit the vehicle 24 through the rear opening when the liftgate 40 is open. However, the scuff plate 44 disclosed herein is designed to reduce the momentum of the cargo items 116 such that the cargo items 116 are retained within the cargo area 84.

Figure 8:
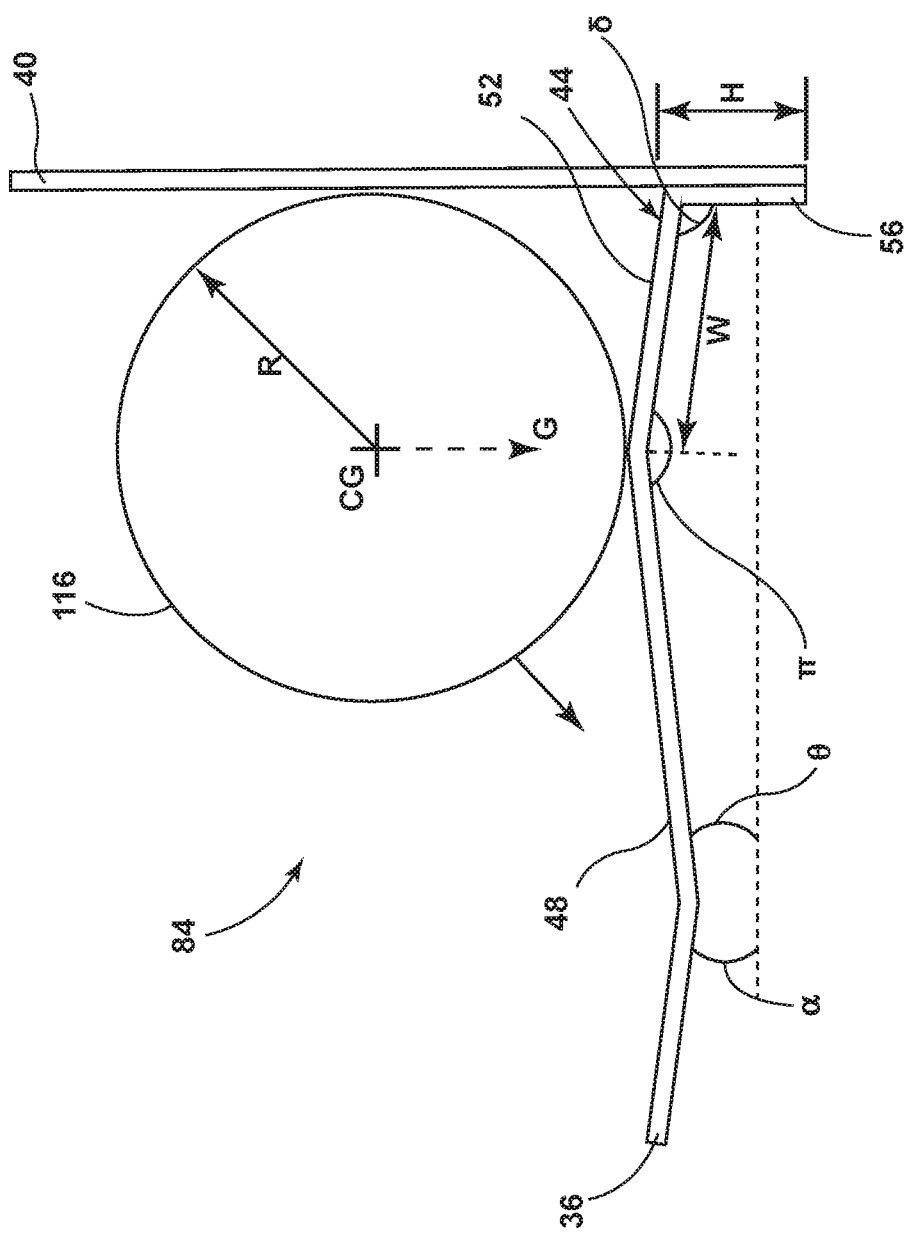
FIG. 8 is a side view of a cargo item in the cargo area, resting on a top side of a scuff plate.

Referring to FIG. 8, when the vehicle 24 (FIG. 1) is in motion the liftgate 40 is typically in the closed position. Therefore, when the liftgate 40 is transitioned from the closed position to the open position it is likely that the vehicle 24 and the cargo items 116 held within the cargo area 84 are at rest (i.e. static) rather than in motion (i.e. dynamic), even if the vehicle 24 is on a steep incline. The size, dimensions, and/or profile of the scuff plate 44 can be configured such that the cargo items 116 have a tendency to abut the sloped front side 48 rather than "perch" or rest atop the top side 52. For example, the width W of the top side 52 can be less than or equal to a radius R of the cargo item 116 that is being retained within the cargo area 84. By maintaining the top side 52 with the width W as less than or equal to the radius R of the cargo item 116, a center of gravity (CG) of the cargo item 116 is vehicle inboard of the liftgate 40 such that the gravitational force G on the cargo item 116 will cause the cargo item to roll down the sloped front side 48 and be retained by the scuff plate 44. The top side 52 can have a topside slope angle π that is in the range of 0-180 degrees. The rear side 56 can have a rear side slope angle δ that is in the range of 0-180 degrees. It is contemplated that when the vehicle 24 is experiencing a substantial angle (e.g. greater than 20-30 degrees), cargo items 116 that are medium to large (i.e. have a radius that is about twice the width of the top side 52, twice the height of the rear side 56, or greater) may be able to overcome the retention provided by the scuff plate 44 due to the CG of the cargo item 116. In such situations, the retractable privacy cover 100 may be placed in the vertical position to aid in retention of the cargo items 116.

Figure 9:
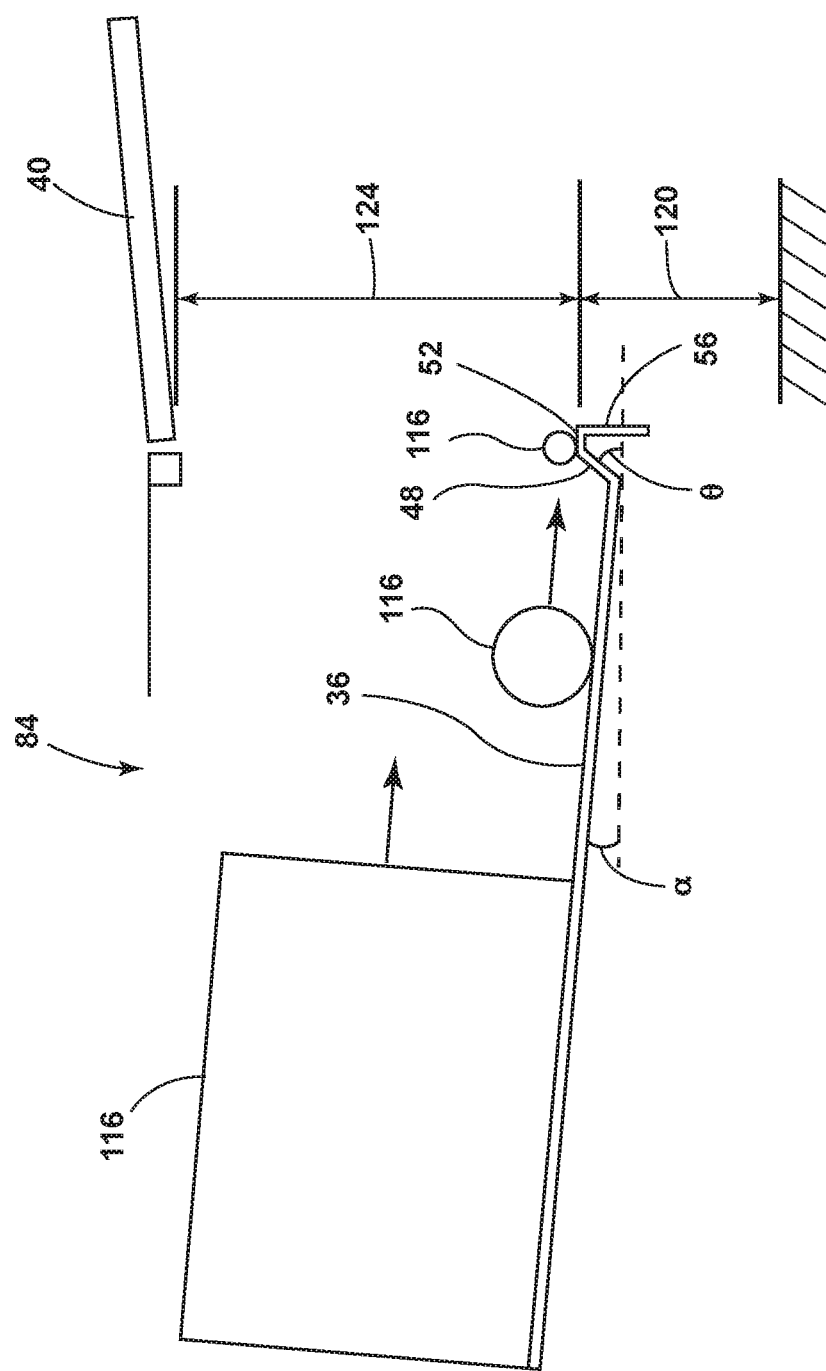
FIG. 9 is a side plan view of the cargo items in the cargo area with the rear liftgate in an open position.

Referring now to FIG. 9, additional design factors or parameters that effect consumer experience and/or perception have been taken into consideration and include, but are not limited to, minimizing the slope angle α of the cargo-area floor panel 36, minimizing a lift over height 120 (measured from the ground to the top of the scuff plate 44), maximizing a vertical opening 124 of the liftgate 40, avoiding "perching" of cargo items 116, minimizing dynamic rollout of cargo items 116, and enabling easy removal of large cargo items 116 (e.g. boxes). The sloped front side 48 of the scuff plate 44 can provide a space underneath large cargo items 116, such as boxes. When the box is slid out of the cargo area 84, the space underneath the box can be utilized by consumers to acquire a more firm grip on or under the box for easier lifting of the box or other large cargo item 116.

Referring again to FIG. 9, the lift over height 120 can be less than about 1.5 m, less than about 1.4 m, less than about 1.3 m, less than about 1.2 m, less than about 1.1 m, less than about 1.0 m, less than about 900 mm, less than about 800 mm, less than about 700 mm, less than about 600 mm, less than about 500 mm, or less than about 400 mm. The vertical opening 124 of the liftgate 40 can be greater than about 700 mm, greater than about 750 mm, greater than about 800 mm, greater than about 850 mm, or greater than about 900 mm. More specifically, the vertical opening 124 can be greater than about 820 mm, greater than about 825 mm, greater than about 830 mm, greater than about 835 mm, greater than about 840 mm, greater than about 845 mm, or greater than about 850 mm. The width W (FIG. 8) of the top side 52 of the scuff plate 44 can be less than about 40 mm, less than about 35 mm, less than about 30 mm, less than about 25 mm, less than about 20 mm, less than about 15 mm, less than about 10 mm, less than about 5 mm. More specifically, the width W of the top side 52 can be about 0-5 mm, about 5-10 mm, about 10-15 mm, about 15-20 mm, about 20-25 mm, or about 25-30 mm. The height H (FIG. 8) of the rear side 56 of the scuff plate 44 can be at least about 9 mm, at least about 12 mm, at least about 15 mm, at least about 18 mm, at least about 21 mm, at least about 24 mm, at least about 27 mm, at least about 30 mm, at least about 33 mm, or at least about 36 mm. A cargo net or the retractable privacy cover 100 (FIG. 3) can be used in addition to the scuff plate 44 to aid in retention of larger items.

Referring to FIG. 10, the vehicle 24 is shown on a steep incline angle Φ, for example fourteen degrees (14°), with the liftgate 40 in the open position. Round and/or cylindrical cargo items 116 can be seen abutting the scuff plate 44 and being retained despite the extreme angle of the surface that the vehicle 24 is parked on. The scuff plate 44 can retain small items, medium items, and large items. Small items can have a radius of about 25 mm or less. Medium items can have a radius of between about 35 mm and about 50 mm. Large items can have a radius of between about 70 mm and 110 mm. The scuff plate 44 can prevent perching and ultimately retain all small items, medium items, and large items when the vehicle 24 is parked on a flat surface (i.e. incline angle Φ is zero degrees). When the vehicle 24 is parked on a steep surface (e.g. incline angle Φ is 10-15 degrees), the scuff plate 44 can prevent perching and ultimately retain all small items, a majority of medium items, and at least fifty percent of large items.

Vehicles 24, such as sport utility vehicles, crossover vehicles, hatchbacks, and the like, are typically equipped with the liftgate 40 or access door. The rearwardmost portion of these vehicles 24 is commonly used for storage of cargo items 116. Cargo items can 116 include generally spherical or cylindrical items (e.g. golf balls, basketballs, paper towel, grocery jars, drink containers, etc.). During normal vehicle 24 operation the cargo items 116 can move into contact with the liftgate 40 or access door. Once the liftgate 40 or access door is opened it is possible for the cargo items 116 to roll and accelerate out of the opened liftgate 40 or access door and onto the ground. A consumer may become frustrated or exasperated at the prospect of trying to catch cargo items 116 as soon as the liftgate 40 or access door is opened, particularly if the cargo item 116 drops to the ground and breaks or is damaged. Conventional cargo nets alone are insufficient to retain cargo items 116, particularly in a lower region of the cargo net proximal the cargo-area floor panel 36 and/or the scuff plate 44. Small to medium sized objects have a tendency to escape the cargo area 84 below the cargo net in the lower region of the cargo net when the liftgate 40 is opened.

The issue of cargo items 116 rolling and accelerating out of the open liftgate 40 or access door can be further amplified by the tendency of cargo areas 84 to have an angle or slope to the cargo-area floor panel 36. The angle or slope of the cargo-area floor panel 36 can be a result of the stowage of the rear seats 28, providing the cargo management system 92, providing storage for a spare tire, etc. Further, when the vehicle 24 is parked, the vehicle 24 is often on an angled surface whether that is a driveway, a city street, or a parking lot with a slope designed to direct water flow. These various situations and design features, individually or in combination, can lead to the acceleration of the cargo items 116 out of the opened liftgate 40 or access door.

The scuff plate 44 described herein addresses the issue of retaining cargo items 116 within the cargo area 84 when the liftgate 40 or access door is opened. The scuff plate 44 addresses these issues, at least in part, by providing the sloped front side 48. In addition, the scuff plate 44 has the top side 52 and the rear side 56 with dimensions that aid in the retention of the cargo items 116. The width of the top side 52 is chosen to be less than or equal to the radius of the smallest cargo item 116 that is intended to be retained. By providing the top side 52 with a width that is less than or equal to the radius of the smallest cargo item 116 to be retained, "perching" events are prevented where the cargo item 116 can rest on top of the top side 52 and ultimately accelerate out of the cargo area 84 when the liftgate 40 is opened. The prevention of the perching events results from the CG of the cargo item 116 being positioned vehicle inboard of the top side 52. The sloped front side 48 aids in the transition of the cargo items 116 from the top side 52 to the cargo area 84. Additionally, the sloped front side 48 helps prevent the cargo items 116 from perching atop one another during normal vehicle 24 operation and thereby prevents acceleration of the cargo items 116 out of the cargo area 84 when the liftgate 40 is opened. The height of the rear side 56 aids in the retention of the cargo items 116 by providing the height to allow the sloped front side 48 to have the desired ramp angle and also by retaining cargo items 116 that have a radius that is less than or equal to the height of the rear side 56. That is, cargo items 116 that are resting at the base of the scuff plate 44 (i.e. the forward most portion of the sloped front side 48) and have a radius that is less than or equal to the height of the rear side 56 are retained due to the CG of the cargo item 116 not being sufficiently greater in height than the height of the rear side 56 to overcome the obstacle of the scuff plate 44. For particularly large cargo items 116, the retractable privacy cover 100 can be employed to further retain cargo items 116 whose radius is larger than the height of the rear side 56 to a sufficient extent to overcome the obstacle of the scuff plate 44.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
    rear seats movable between a use position and a stowed position;
    a closeout panel that extends over the rear seats when the rear seats are placed in the stowed position;
    a cargo-area floor panel positioned rearward of the rear seat; and
    a ramped scuff plate positioned between the cargo-area floor panel and a liftgate when the liftgate is in a closed position, wherein the ramped scuff plate comprises a sloped front side in physical contact with the cargo-area floor panel.

2. The vehicle of claim 1, wherein the closeout panel is a seatback of the rear seat.

3. The vehicle of claim 1, wherein the closeout panel has a closeout panel angle in the range of about 0-10 degrees.

4. The vehicle of claim 3, wherein the closeout panel has a closeout panel angle of about 3 degrees.

5. The vehicle of claim 1, wherein the cargo-area floor panel has a slope angle of about 0-10 degrees.

6. The vehicle of claim 1, wherein the sloped front side has a ramp angle of at least about 15 degrees.

7. The vehicle of claim 1, further comprising:
    a rear side that defines a rearwardmost portion of the ramped scuff plate, wherein the rear side has a height of at least about 18 mm.

8. The vehicle of claim 7, further comprising:
    a top side that defines an upper extreme of the ramped scuff plate, wherein the top side has a width of less than 20 mm.

9. A vehicle, comprising:
    a ramped scuff plate positioned between a cargo-area floor panel and an access door when the access door is in a closed position, wherein the ramped scuff plate comprises a sloped front side rearward of the cargo-area floor panel.

10. The vehicle of claim 9, further comprising:
    a top side that defines an upper extreme of the ramped scuff plate.

11. The vehicle of claim 9, wherein the cargo-area floor panel has a slope angle of about 0-10 degrees.

12. The vehicle of claim 9, wherein the sloped front side has a ramp angle of at least about 10 degrees.

13. The vehicle of claim 10, wherein the top side has a height of at least about 15 mm.

14. The vehicle of claim 13, wherein the top side has a width of less than 20 mm.

15. A scuff plate for a vehicle comprising:
    a sloped front side having a ramp angle greater than zero in an upward direction, wherein the scuff plate is positioned entirely vehicle forward of, and adjacent to a closed liftgate.

16. The scuff plate for a vehicle of claim 15, further comprising:
    a top side that defines an upper extreme.

17. The scuff plate for a vehicle of claim 16, wherein the top side operably couples with the sloped front side to form a top side slope angle, and wherein the top side slope angle is in the range of about 0-180 degrees.

18. The scuff plate for a vehicle of claim 15, further comprising:
    a rear side that defines a rearwardmost portion.

19. The scuff plate for a vehicle of claim 18, wherein the rear side operably couples with the sloped front side to form a rear side slope angle, and wherein the rear side slope angle is in the range of about 0-180 degrees.

20. The scuff plate for a vehicle of claim 15, wherein the ramp angle is at least about 15 degrees.

* * * * *